US008981910B2

(12) United States Patent
Sano

(10) Patent No.: US 8,981,910 B2
(45) Date of Patent: Mar. 17, 2015

(54) RFID TAG ISSUING APPARATUS AND RFID TAG MISALIGNMENT DETECTING METHOD

(75) Inventor: Kouichi Sano, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 312 days.

(21) Appl. No.: 13/539,738

(22) Filed: Jul. 2, 2012

(65) Prior Publication Data

US 2013/0015959 A1    Jan. 17, 2013

(30) Foreign Application Priority Data

Jul. 12, 2011 (JP) ................................. 2011-154238

(51) Int. Cl.
  H04Q 5/22 (2006.01)
  G08B 21/00 (2006.01)
  G06K 19/06 (2006.01)
  G06K 7/10 (2006.01)
  G06K 7/02 (2006.01)
  B41J 29/00 (2006.01)
  (Continued)

(52) U.S. Cl.
  CPC ....... *H04Q 5/22* (2013.01); *H04Q 2213/13095* (2013.01)
  USPC ....... 340/10.51; 340/10.1; 340/675; 340/676; 340/686.1; 340/686.2; 235/492; 235/451; 235/472.02; 400/679; 400/76; 702/81; 702/84; 702/127; 702/172; 700/95; 700/129; 700/110; 700/125; 156/64; 156/238; 156/264

(58) Field of Classification Search
  USPC .................. 340/10.1, 675–676, 686.1–686.2; 235/492, 451, 472.02; 400/679, 76; 702/81–84, 127–172; 700/95–129, 700/110, 125; 156/64, 238, 264
  See application file for complete search history.

(56) References Cited

U.S. PATENT DOCUMENTS 7,187,294 B2 * 3/2007 Burdette et al. ........... 340/686.1
7,261,479 B2 * 8/2007 Barrus et al. .................... 400/76
(Continued)

FOREIGN PATENT DOCUMENTS

JP       11-138941       5/1999
JP       2001-096814    4/2001
(Continued)

OTHER PUBLICATIONS

First Office Action for Japanese Patent Application No. 2011-154238 Dated Jun. 24, 2014, 9 pgs.

*Primary Examiner* — Jennifer Mehmood
*Assistant Examiner* — Emily C Terrell
(74) *Attorney, Agent, or Firm* — Amin, Turocy & Watson, LLP

(57) ABSTRACT

According to one embodiment, an RFID tag issuing apparatus includes a communication instructing unit, a search unit, and a misalignment amount detecting unit. The communication instructing unit instructs a reader-writer unit to communicate with the RFID tag at a reference position that is reached when the label is carried by a predetermined amount in a predetermined direction after the specific position on the label is detected by a label position detecting unit. The search unit repeats a carrying of the label and a communication instruction to the reader-writer unit when communication cannot be established with the RFID tag, and thus searches for a communication-available range with the RFID tag. The misalignment amount detecting unit detects an amount of carrying of the label to reach the communication-available range from the reference position, as a misalignment amount of the RFID tag.

17 Claims, 15 Drawing Sheets

(51) Int. Cl.
  *G01N 37/00* (2006.01)
  *G01D 1/00* (2006.01)
  *G01B 5/02* (2006.01)
  *G01B 7/02* (2006.01)
  *G06F 19/00* (2011.01)
  *B29C 65/00* (2006.01)

(56) References Cited

U.S. PATENT DOCUMENTS

| 7,425,896 | B2 * | 9/2008 | Kawamata | 340/572.1 |
|---|---|---|---|---|
| 7,436,302 | B2 * | 10/2008 | Jessup | 340/572.1 |
| 7,439,865 | B2 | 10/2008 | Murofushi et al. | |
| 8,258,929 | B2 * | 9/2012 | Wirrig et al. | 340/10.51 |
| 8,436,734 | B2 * | 5/2013 | Kato et al. | 340/572.8 |
| 2007/0268322 | A1 * | 11/2007 | Kyoi | 347/16 |
| 2012/0153089 | A1 * | 6/2012 | Galm et al. | 246/122 R |

FOREIGN PATENT DOCUMENTS

| JP | 2006-338179 | 12/2006 |
|---|---|---|
| JP | 2006-343894 | 12/2006 |
| JP | 2008-141433 | 6/2008 |
| WO | 2008-126150 | 10/2008 |

* cited by examiner

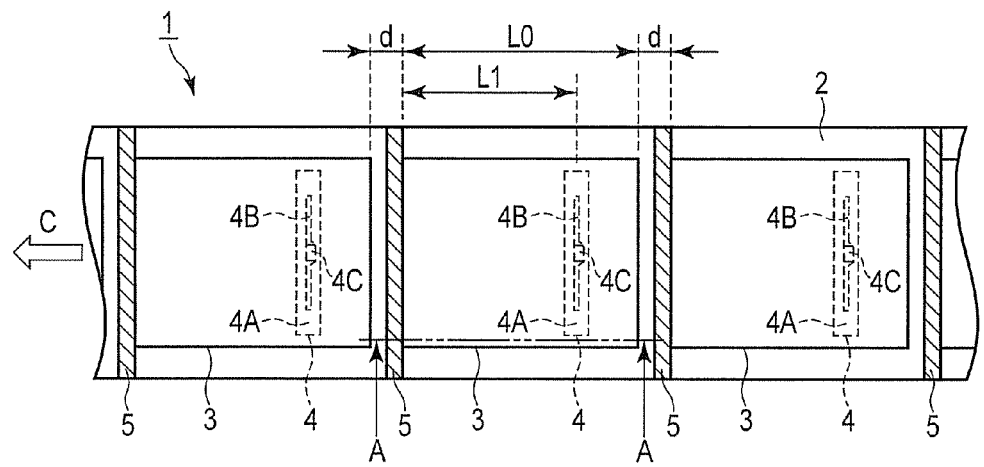
F I G. 1
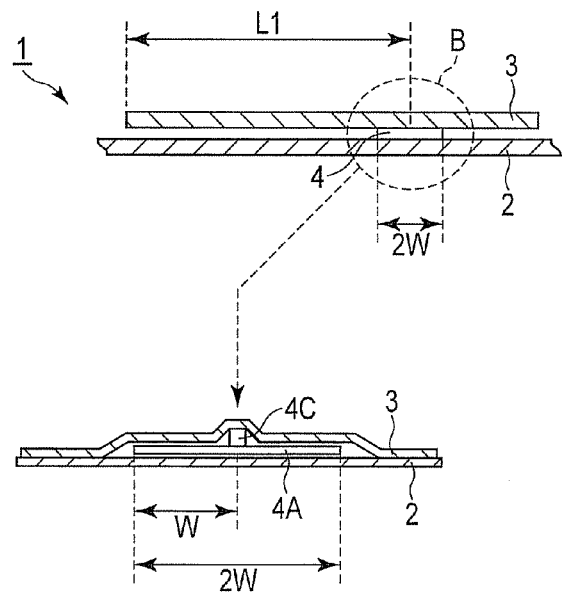
F I G. 2

| Step number | Result of writing |
|---|---|
| 1 | OK/NG |
| 2 | OK/NG |
| 3 | OK/NG |
| 4 | OK/NG |
| ⋮ | ⋮ |
| N | OK/NG |

31

| | |
|---|---|
| Number of quality tags | C1 |
| Number of defective tags | C2 |
| Number of tags with allowable misalignment | C3 |
| Number of tags with abnormal misalignment | C4 |
| Number of tags with communication failure | C5 |

32

| Case number | Misalignment amount |
|---|---|
| 1 | Le1 |
| 2 | Le2 |
| 3 | Le3 |
| 4 | Le4 |
| ⋮ | ⋮ |

33

F I G. 5

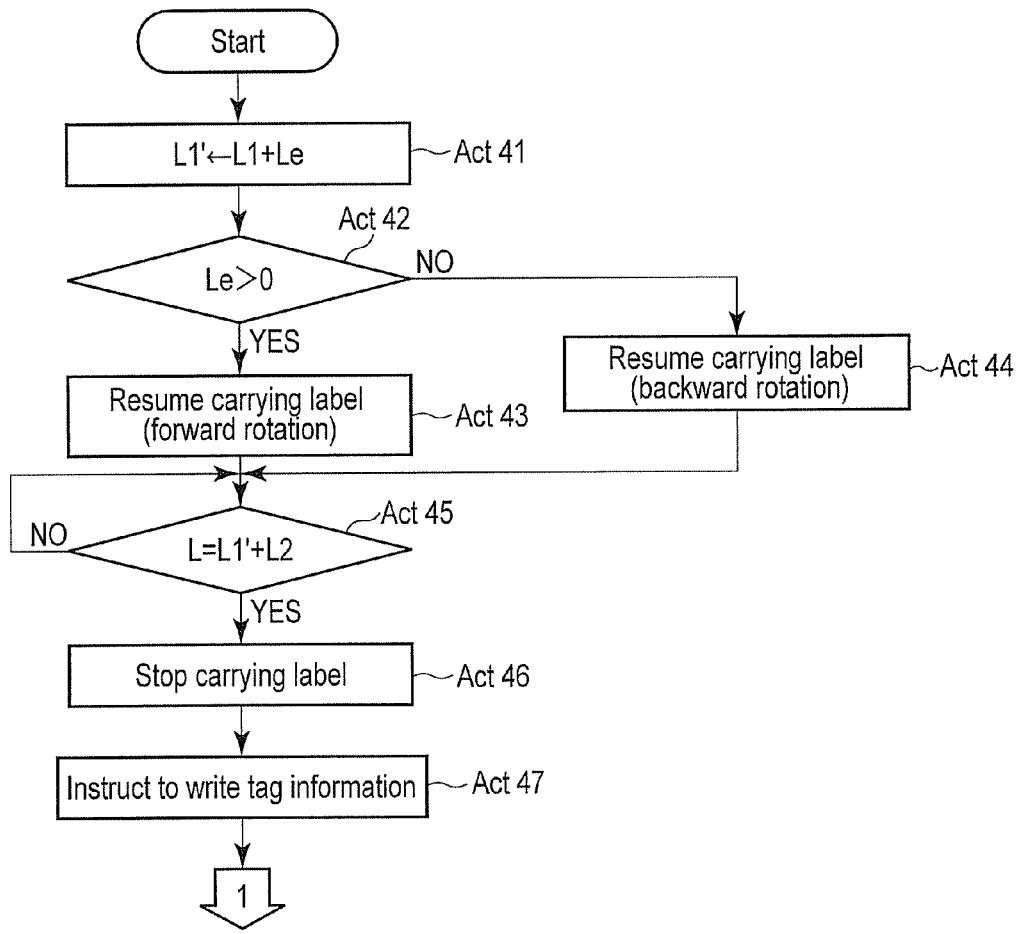
F I G. 9

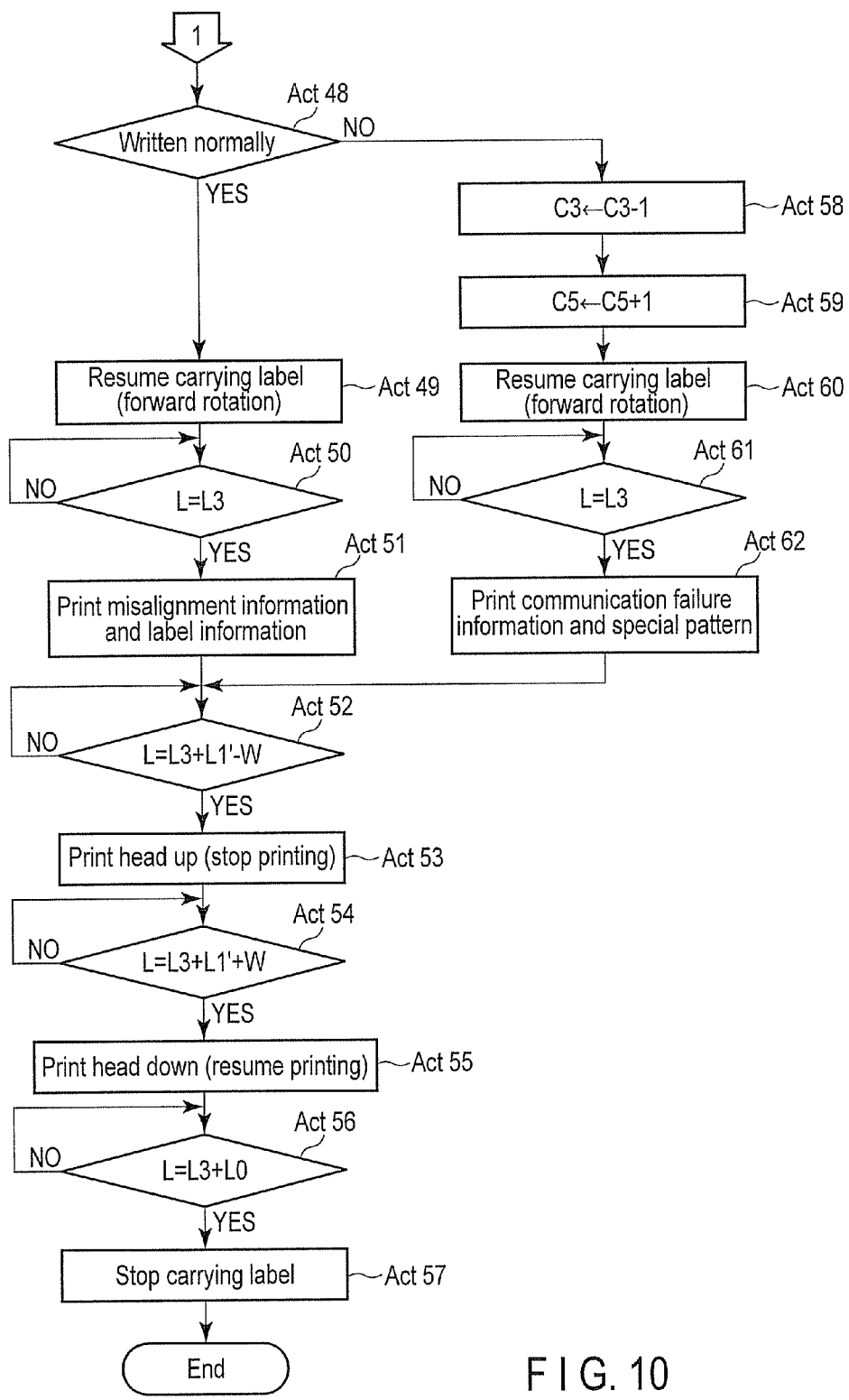
F I G. 10

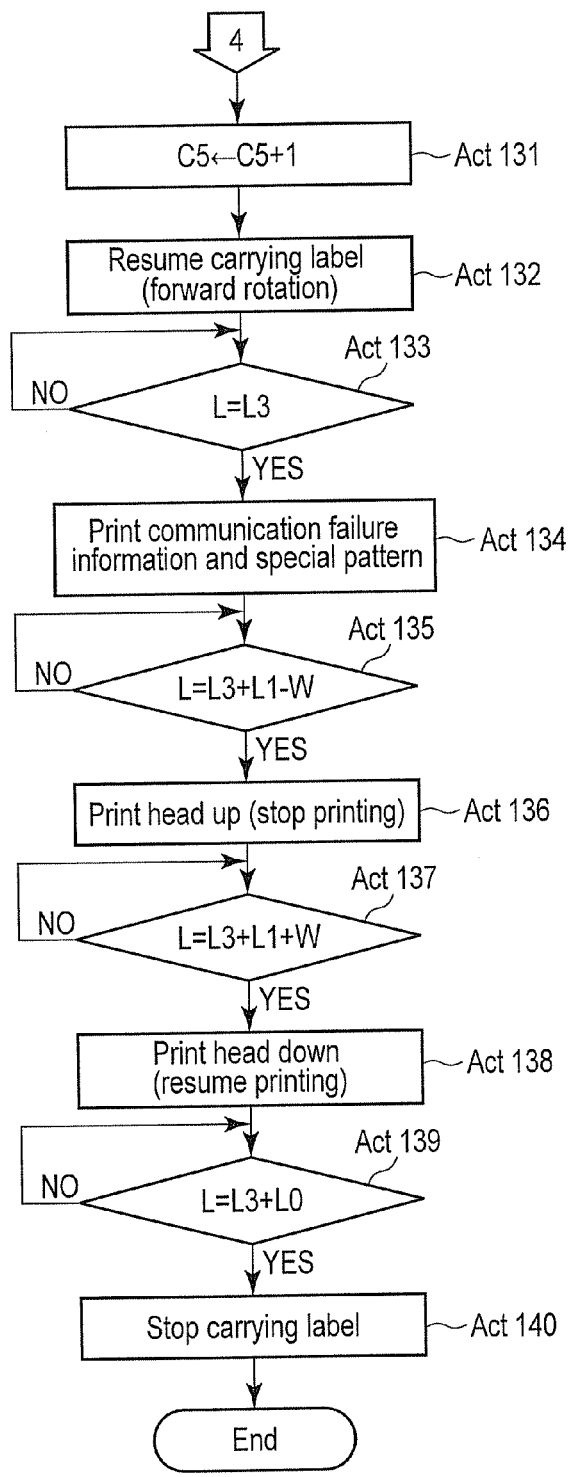
F I G. 14

| Step number | Result of writing | Reception level |
|---|---|---|
| 1 | OK/NG | |
| 2 | OK/NG | |
| 3 | OK/NG | |
| 4 | OK/NG | |
| ⋮ | ⋮ | ⋮ |
| N | OK/NG | |

33 ically, a sensor for detecting a specific position on 25 FIG. 18 is a flowchart showing a process procedure after the label, for example, a forward edge of the label, is provided the determination in ACT 153 results in "YES".
RFID TAG ISSUING APPARATUS AND RFID TAG MISALIGNMENT DETECTING METHOD

CROSS-REFERENCE TO RELATED APPLICATIONS

This application is based upon and claims the benefit of priority from prior Japanese Patent Application No. 2011-154238, filed Jul. 12, 2011, the entire contents of which are incorporated herein by reference.

FIELD

Embodiments described herein relate generally to an apparatus for issuing an RFID (radio frequency identification) tag attached to a label and an RFID tag misalignment detecting method.

BACKGROUND

In an RFID tag issuing apparatus, an antenna of a tag reader-writer is arranged midway along a carrying path through which a label with an RFID tag is carried. Also, in the issuing apparatus, a sensor for detecting a specific position on the label, for example, a forward edge of the label, is provided upstream of the antenna in a carrying direction.

As the specific position on the label is detected by the sensor, a controller of the issuing apparatus instructs the tag reader-writer to communicate with the RFID tag after the label is carried by a predetermined amount. At this point, if the RFID tag is attached to a correct position on the label, the RFID tag enters a position facing the antenna, that is, enters a communication range of the antenna. Therefore, wireless communication is carried out between the tag reader-writer and the RFID tag and data is written onto the RFID tag in a contactless manner.

However, if the RFID tag is attached to a position shifted upward or downward in the carrying direction from the normal position, the RFID tag does not reach the position facing the antenna when the label is carried by the predetermined amount after the specific position on the label is detected. In this case, the tag reader-writer cannot communicate with the RFID tag. Therefore, the issuing apparatus treats the label with the RFID tag incapable of communication as a defective product.

A reduction in the number of labels which are treated as defective products because of the misalignment of the RFID tag is required.

BRIEF DESCRIPTION OF THE DRAWINGS

FIG. 1 is a plan view of a label sheet used in an embodiment.

FIG. 2 is a sectional view taken along a line indicated by arrows A-A in FIG. 1 and an enlarged view of an area B in the sectional view.

FIG. 5 shows a principal data table formed in a storage.

FIG. 9 is a flowchart showing the former half of the procedure of a process of issuing a tag label with allowable misalignment.

FIG. 10 is a flowchart showing the latter half of the procedure of the process of issuing a tag label with allowable misalignment.

FIG. 14 is a flowchart showing a process procedure after the determination in ACT 122 results in "YES".

DETAILED DESCRIPTION

Figure 3:
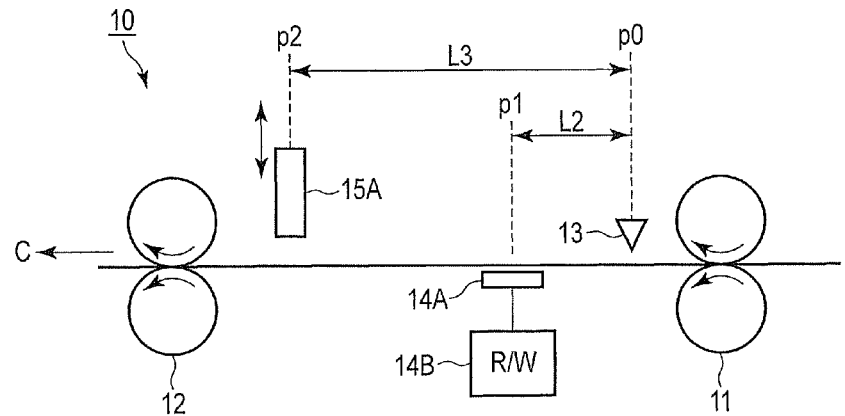
FIG. 3 is a schematic view showing an issuing mechanism of an RFID tag issuing apparatus according to the embodiment.

In general, according to one embodiment, an RFID tag issuing apparatus includes a reader-writer unit, a label position detecting unit, a communication instructing unit, a search unit, and a misalignment amount detecting unit. The reader-writer unit reads and writes data by wireless communication with an RFID tag attached to a label. The label position detecting unit detects a specific position on the label. The communication instructing unit instructs the reader-writer unit to communicate with the RFID tag at a reference position that is reached when the label is carried by a predetermined amount in a predetermined direction after the specific position on the label is detected by the label position detecting unit. The search unit repeats a carrying of the label and a communication instruction to the reader-writer unit when communication cannot be established with the RFID tag as a result of an operation of the reader-writer unit according to the instruction from the communication instructing unit, and thus searches for a communication-available range with the RFID tag. The misalignment amount detecting unit detects an amount of carrying of the label to reach the communication-available range from the reference position, as a misalignment amount of the RFID tag.

In this embodiment, an RFID tag issuing apparatus which issues an RFID tag attached to a label is illustrated. First, a label sheet 1 used in this embodiment will be described with reference to the plan view of FIG. 1 and the A-A sectional view and the enlarged view of a B portion shown in FIG. 2.

The label sheet 1 includes a number of rectangular labels 3 on a surface of a band-shaped backing paper 2, the labels 3 being pasted in a line at a predetermined space d from each other in the longitudinal direction of the backing paper 2. An RFID tag 4 is attached to an adhering side of each label 3 on the backing paper 2. The RFID tag 4 includes a tag antenna 4B and an IC chip 4C arranged on a tag bogy 4A. The RFID tag 4 is a passive tag without a battery.

A mounting position of the RFID tag 4 on the label 3 is decided according to the type of the label sheet 1. On the label sheet 1 of FIG. 1, the RFID tag 4 is mounted at a position that is at a distance L1 (L1<L0) from a forward edge in relation to a total length L0 in the same direction as a carrying direction C of the label 3. The RFID tag 4 is mounted on the label 3 in such a way that the longitudinal direction of the tag antenna 4B forms right angles to the carrying direction C. On the forward edge side of each label 3 on the surface of the backing paper 2, a mark 5 indicating the leading end of the label 3 is provided. The mark 5 is provided on the backing paper 2 in such a way that a downstream edge thereof in relation to the carrying direction C coincides with the forward edge of the label 3.

Meanwhile, the RFID tag 4 is mounted on the adhering side of the label 3 on the backing paper 2 in such a way that the tag antenna 4B forms right angles to the carrying direction C, as described above. Therefore, on the label 3 pasted on the surface of the backing paper 2, a step equivalent to the thickness of the tag body 4A and the thickness of the IC chip 4C situated substantially at the center of the tag body 4A is generated across a width 2W in a short-side direction of the tag body 4A of the RFID tag 4, as shown in FIG. 2.

Figure 4:
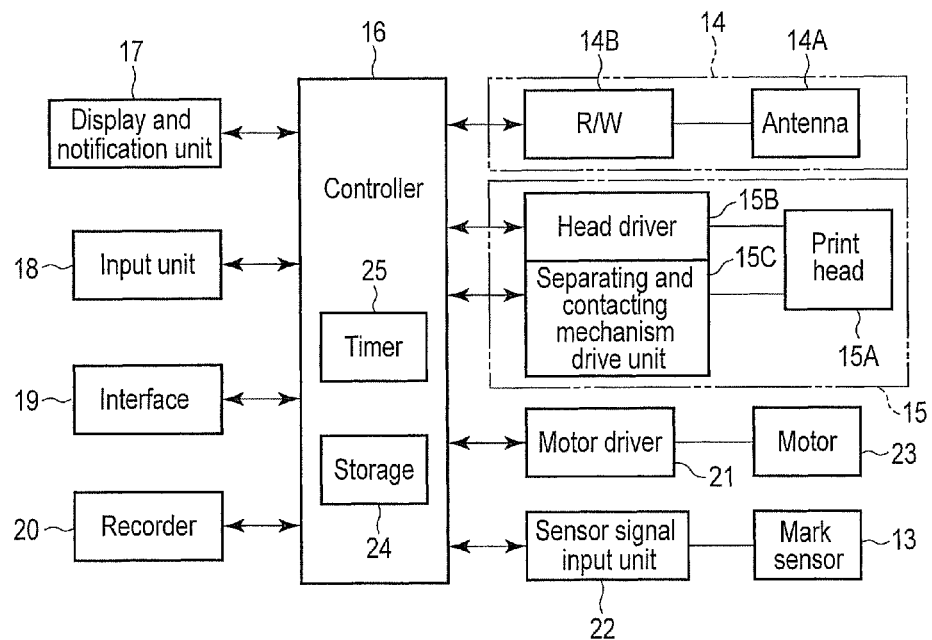
FIG. 4 is a block diagram showing the overall configuration of the RFID tag issuing apparatus.

Next, the configuration of a RFID tag issuing apparatus 10 according to this embodiment will be described with reference to FIGS. 3 and 4. FIG. 3 is a schematic view showing the issuing mechanism of the RFID tag issuing apparatus 10. FIG. 4 is a block diagram showing the overall configuration of the RFID tag issuing apparatus 10.

As shown in FIG. 3, in the RFID tag issuing apparatus 10, two carrying rollers 11, 12 carry the label sheet 1 in the direction of an arrow C. In the RFID tag issuing apparatus 10, a mark sensor 13, an antenna 14A of a reader-writer unit 14, and a print head 15A of a print unit 15 are arranged in order from upstream of the carrying direction C along a carrying path of the label sheet 1. Specifically, if the position of the mark sensor 13 is an origin p0, the antenna 14A is arranged downstream at a distance L2 and the print head 15A is arranged downstream at a distance L3 (L3>L2).

The mark sensor 13, for example, optically detects the mark 5 on the label sheet 1. The mark sensor 13 scans the surface of the label sheet 1 carried on the carrying path, along the carrying direction C. As the mark sensor 13 detects the downstream edge of the mark 5 in relation to the carrying direction C, the mark sensor 13 outputs an ON-signal. As the mark sensor 13 detects the upstream edge, the mark sensor 13 outputs an OFF-signal.

The reader-writer unit 14 includes the antenna 14A and a reader-writer body 14B. The reader-writer body 14B radiates a non-modulated wave (electromagnetic wave) from the antenna 14A in order to communicate wirelessly with the RFID tag 4. Receiving the non-modulated wave, the RFID tag 4 starts up and sends back a response wave. As the reader-writer body 14B receives the response wave from the RFID tag 4 at the antenna 14A, the reader-writer body 14B communicates with the RFID tag 4. When writing data to the RFID tag 4, the reader-writer body 14B performs amplitude modulation of the electromagnetic wave radiated from the antenna 14A with a signal of encoded writing data. The RFID tag 4 changes the impedance of the antenna 4B and thereby reflects or absorbs the received radio wave. The reader-writer body 14B receives the reflected wave from the RFID tag 4 at the antenna 14A, then demodulates the reflected wave and thus obtains the received data from the RFID tag 4.

The print unit 15 includes the print head 15A, a head driver 15B, and a separating and contacting mechanism drive unit 15C. The head driver 15B drives the print head 15A to print on a print surface of the label 3, that is, a surface opposite to the side where the RFID tag 4 is attached. The separating and contacting mechanism drive unit 15C causes the print head 15A to reciprocate in directions toward and away from the label sheet 1 carried on the carrying path.

As shown in FIG. 4, the reader-writer body 14B of the reader-writer unit 14 and the head driver 15B and the separating and contacting mechanism drive unit 15C of the print unit 15 are connected to a controller 16. Also, a display and notification unit 17, an input unit 18, an interface 19, a recorder 20, a motor driver 21 and a sensor signal input unit 22 or the like are connected to the controller 16.

The display and notification unit 17 is a display, buzzer or the like. The input unit 18 is a keyboard, pointing device, touch panel or the like. The recorder 20 is formed by a non-volatile recording medium such as HDD (hard disk drive). The sensor signal input unit 22 inputs a signal from various sensors including the mark sensor 13.

The interface 19 is an interface with an upper device. The RFID tag issuing apparatus 10 receives data from the upper device via the interface 19. The received data includes data to be written into the RFID tag 4 and data to be printed on the label 3. The RFID tag issuing apparatus 10 also transmits data to the upper device via the interface 19. The transmitted data includes issue record data of the label 3.

The motor driver 21 controls forward and backward rotations of a motor 23. As the motor 23 rotates forward, the carrying rollers 11, 12 rotate in the directions indicated by arrows in FIG. 3. Consequently, the label sheet 1 is carried in the direction of arrow C. As the motor 23 rotates backward, the carrying rollers 11, 12 rotate in the direction opposite to the arrows in FIG. 3. Consequently, the label sheet 1 is carried in the direction opposite to the arrow C.

The controller 16 has a CPU (central processing unit) as a principal component and includes a storage 24 of ROM (read only memory) and RAM (random access memory). The controller 16 also includes a timer 25 therein. The controller 16 controls each unit according to a program stored in the storage 24 and thereby realizes a function as the RFID tag issuing apparatus 10.

In the RFID tag issuing apparatus 10 of this configuration, a writing result table 31, a counter table 32 and a misalignment amount table 33 are formed in the storage 24. The tables 31, 32, 33 are shown in FIG. 5.

The writing result table 31 has an area for storing information indicating a result of data writing to the RFID tag 4 (OK or NG) for each step number from 1 to N (an integer that is N≥2). The counter table 32 has an area where each of a number of quality tags C1, a number of defective tags C2, a number of tags with allowable misalignment C3, a number of tags with abnormal misalignment C4 and a number of tags with communication failure C5 is counted. The misalignment amount table 33 has an area for storing misalignment amounts Le1, Le2, Le3, Le4, . . . in order of case number.

The writing result table 31 is used to detect a misalignment of the RFID tag 4. Now, the misalignment of the RFID tag 4 will be described.

As described above, the mounting position of the RFID tag 4 on the label 3 is predetermined according to the type of the label sheet 1. That is, the RFID tag 4 is mounted at a position that is at the distance L1 from the edge that becomes the forward edge of the label 3 in the carrying direction C. Therefore, as the label sheet 1 is carried by a distance (L1+L2) after the forward edge of the label 3 is detected by the mark sensor 13, the antenna 4B of the RFID tag 4 attached to the label 3 reaches the position facing the antenna 14A. Consequently, the RFID tag 4 enters the communication range of the antenna 14A and therefore the reader-writer unit 14 can wirelessly communicate with the RFID tag 4.

However, though very rarely, there is a label 3 on which the mounting position of the RFID tag 4 is shifted upstream or downstream in the carrying direction C. If the mounting position of the RFID tag 4 is shifted, the antenna 4B of the RFID tag 4 does not reach the position facing the antenna 14A even when the label sheet 1 is carried by the distance (L1+L2) after the forward edge of the label 3 is detected. Therefore, the reader-writer unit 14 cannot wirelessly communicate with the RFID tag 4 of this label 3.

In the related art, such a label 3 is treated as a defective product. However, only the mounting position of the RFID tag 4 is shifted and the function of the label 3 with the RFID tag 4 is not impaired. Thus, in this embodiment, in the case of the label 3 on which the mounting position of the RFID tag 4 is shifted, the RFID tag issuing apparatus 10 detects the amount of shift thereof. If the amount of shift is known, correcting the amount of carrying the label sheet 1 by the amount of shift enables the antenna 4B of the RFID tag 4 to enter the communication range of the antenna 14A. Consequently, the RFID tag issuing apparatus 10 can write data onto the RFID tag 4.

The following is a first embodiment of detecting the amount of shift of the RFID tag 4. First, the label position detecting unit detects the forward edge as a specific position on the label 3 carried along the carrying path, based on a signal from the mark sensor 13. As the forward edge of the label 3 is detected, the communication instructing unit instructs the reader-writer unit 14 to communicate with the RFID tag 4 at a reference position that is reached when the label 3 is carried by a predetermined amount (L1+L2) in the carrying direction C after the detection. Consequently, when communication with the RFID tag 4 is not possible, the search unit repeats the carrying of the label 3 and the communication instruction to the reader-writer unit 14 and thus searches a communication-available range with the RFID tag 4. The misalignment amount detecting unit detects the amount of carrying the label 3 from the reference position to the center of the communication-available range as a misalignment amount of the RFID tag 4.

The label position detecting unit, the communication instructing unit, the search unit and the misalignment amount detecting unit are realized by the controller 16 operating according to a pre-installed program.

Figure 6:
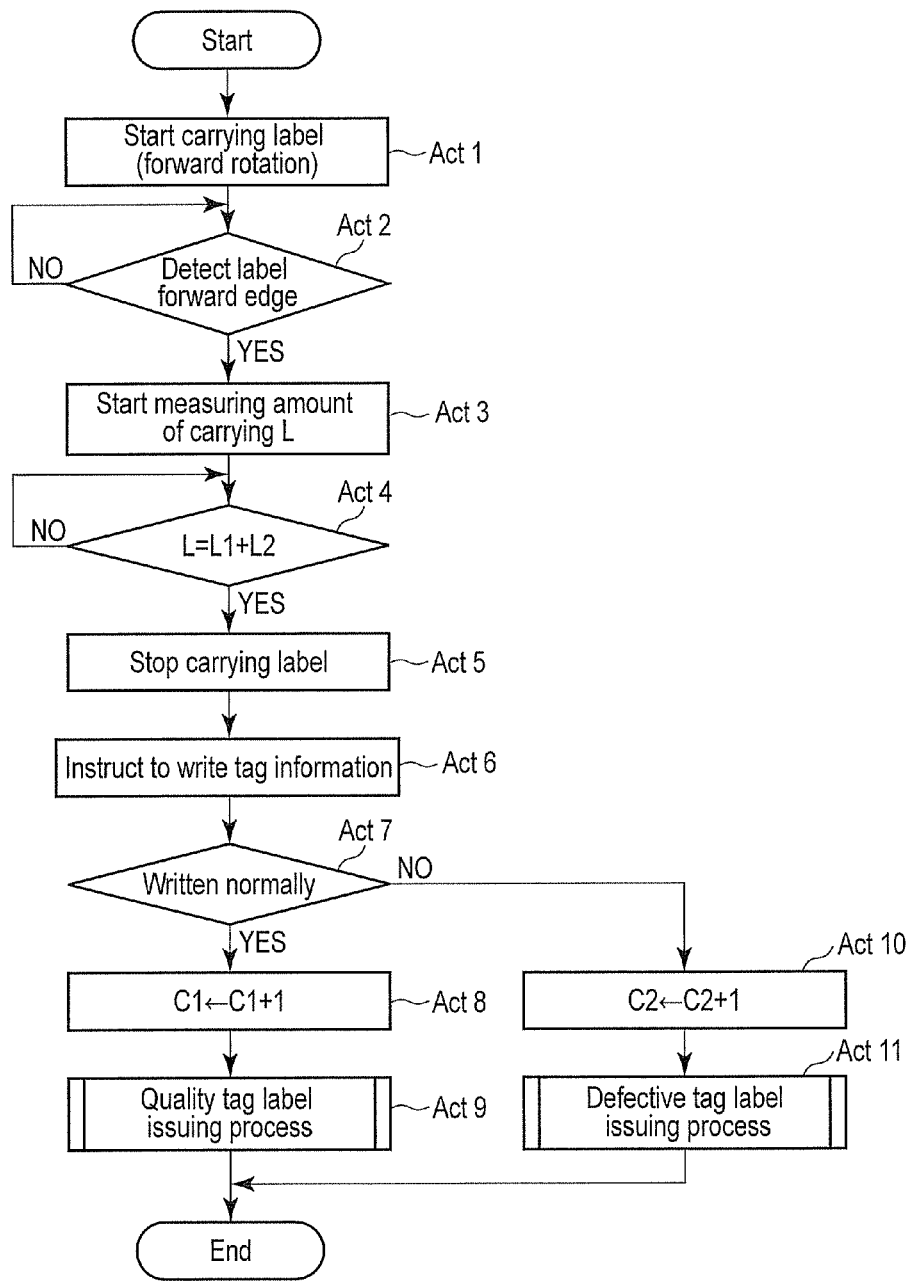
FIG. 6 is a flowchart showing a process procedure executed by the controller according to a program.

FIG. 6 is a flowchart showing an operation procedure of the controller 16. First, the controller 16 outputs a forward rotation drive signal for the motor 23 to the motor driver 21 (ACT 1). Since the label sheet 1 is thus carried in the carrying direction C, the controller 16 monitors the sensor signal input unit 22 and waits for the forward edge as a specific position on the label 3 to be detected by the mark sensor 13 (ACT 2).

The mark sensor 13 switches on when the edge that is downstream in the carrying direction from the mark 5 provided on the label sheet 1 is detected. The mark sensor 13 switches off when the edge that is upstream is detected. The edge that is upstream in the carrying direction from the mark 5 coincides with the forward edge of the label 3. Therefore, the controller 16 waits for the signal from the mark sensor 13 to change from on to off. As a change of the signal from the mark sensor 13 from on to off is detected, the controller 16 determines that the forward edge of the label 3 is detected (label position detecting unit).

As the forward edge of the label 3 is detected (YES in ACT 2), the controller 16 starts measuring an amount of carrying L of the label 3 (ACT 3). The amount of carrying per unit time of the label 3 carried through the carrying path by a forward rotation drive of the motor 23 is constant. Thus, the controller 16 starts timing with the timer 25 at the time point when the signal from the mark sensor 13 changes from on to off, and calculates the amount of carrying L of the label 3 based on the time measured and a preset amount of carrying per unit time.

The controller 16 waits for the amount of carrying L to reach a distance (L1+L2) (ACT 4). As the amount of carrying L reaches the distance (L1+L2) (YES in ACT 4), the controller 16 stops the forward rotation drive signal and stops the carrying of the label 3 (ACT 5). Next, the controller 16 instructs the reader-writer body 14B to write tag identification information (ID) (ACT6: communication instructing unit).

Receiving this writing instruction, the reader-writer body 14B first radiates a non-modulated wave (electromagnetic wave) from the antenna 14A in order to start up the RFID tag 4. As a response wave is received from the RFID tag 4, the reader-writer body 14B performs amplitude modulation of the electromagnetic wave radiated from the antenna 14A, with a signal obtained by encoding the tag identification information. Thus, the tag identification information is written to the RFID tag 4.

The controller 16 checks whether the tag identification information is written to the RFID tag 4 normally or not (ACT 7). For example, the controller 16 reads the data after the writing from the RFID tag 4 and collates the read data with the written data to determine whether these data coincide with each other. If these data coincide with each other, the controller 16 recognizes that the tag identification information is written normally.

Generally, if the RFID tag 4 is correctly attached at a prescribed position on the label 3, the RFID tag 4 enters the communication range of the antenna 14A as the label 3 is carried by the distance (L1+L2) after the forward edge of the label 3 is detected. Therefore, the tag identification information is written to the RFID tag 4 in a contactless manner as long as there is no problem with the RFID tag 4.

If the tag identification information is written normally to the RFID tag 4 (YES in ACT 7), the controller 16 increments the number of quality tags C1 in the counter table 32 by "1" (ACT 8). After that, the controller 16 executes a quality tag label issuing process, described later, and ends the process of this time on the label 3 (ACT 9).

Meanwhile, if the reader-writer body 14B cannot receive a response wave from the RFID tag 4, the controller 16 recognizes that the tag identification information is not written normally. The same applies to the case where the read data from the RFID tag 4 and the written data do not coincide with each other. In such case (NO in ACT 7), the controller 16 increments the number of defective tags C2 in the counter table 32 by "1" (ACT 10). After that, the controller 16 executes a defective tag label issuing process, described later, and ends the process of this time on the label 3 (ACT 11).

Figure 7:
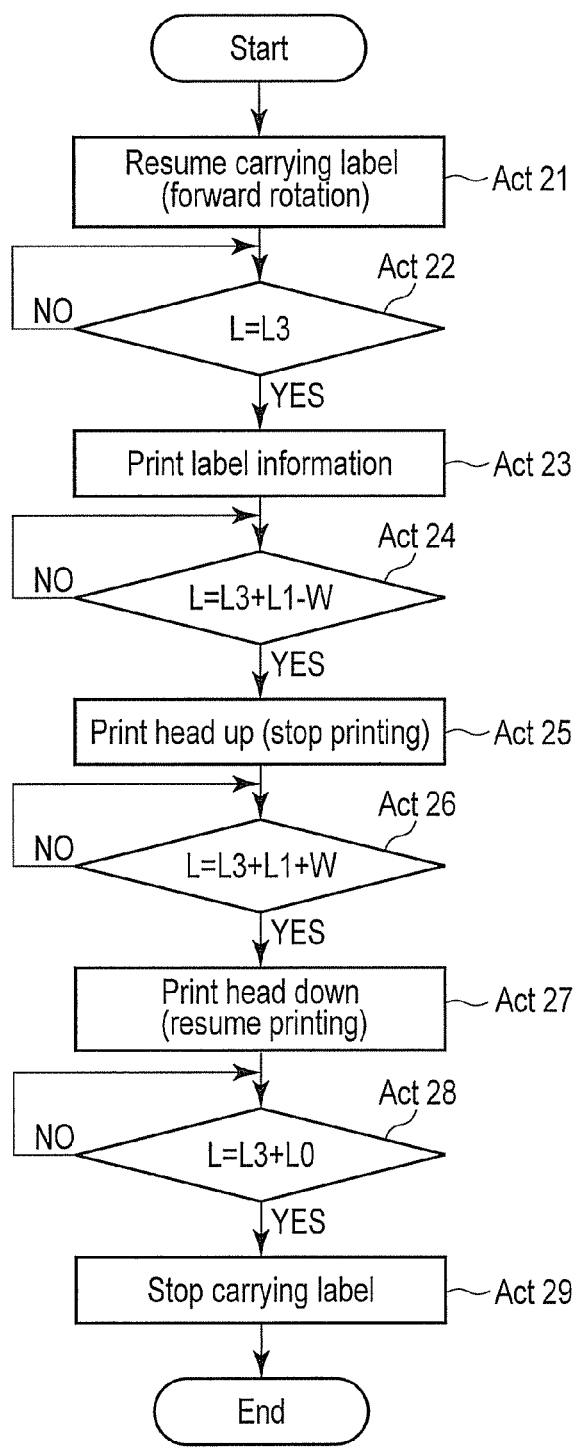
FIG. 7 is a flowchart showing the procedure of a quality tag label issuing process.

FIG. 7 is a flowchart showing the procedure of the quality tag label issuing process shown as ACT 9 in FIG. 6. As the quality tag label issuing process starts, the controller 16 outputs a forward rotation drive signal for the motor 23 again to the motor driver 21 (ACT 21). Thus, the label 3 is carried further in the carrying direction C. The controller 16 resumes measuring the amount of carrying L1. The controller 16 then waits for the amount of carrying L to reach a distance L3 (ACT 22).

As the amount of carrying L reaches the distance L3 (YES in ACT 22), the forward edge of the label 3 with the tag identification information written on the RFID tag 4 is carried to the center of the print head 15A. Then, the controller 16 outputs a head-down drive signal to the separating and contacting mechanism drive unit 15C. The controller 16 also outputs label information as print data to the head driver 15B (ACT 23). Thus, the print head 15A abuts on a print surface of the label 3 and the label information is printed on the print surface.

Also in this printing, the controller 16 continues measuring the amount of carrying L. The controller 16 waits for the amount of carrying L to reach a distance (L3+L1−W) (ACT 24). As the amount of carrying L reaches the distance (L3+L1−W) (YES in ACT 24), the stepped portion due to the RFID tag 4 on the label 3 arrives in front of the print head 15A. Then, the controller 16 outputs a head-up drive signal to the separating and contacting mechanism drive unit 15C (ACT 25). Thus, the print head 15A moves away from the print surface of the label 3 and the printing is suspended.

After that, the controller 16 waits for the amount of carrying L to reach a distance (L3+L1+W) (ACT 26). As the amount of carrying L reaches the distance (L3+L1+W) (YES in ACT 26), the stepped portion due to the RFID tag 4 on the label 3 passes the position of the print head 15A. Then, the controller 16 outputs a head-down drive signal again to the separating and contacting mechanism drive unit 15C (ACT 27). Thus, the print head 15A abuts again on the print surface of the label 3 and the printing is resumed. Therefore, the label information is printed on a portion where no step is formed by the RFID tag 4, of the print surface of the label 3.

After that, the controller 16 waits for the amount of carrying L to reach a distance (L3+L0) (ACT 28). As the amount of carrying L reaches the distance (L3+L0) (YES in ACT 28), the rear edge of the label 3 is carried to the center of the print head 15A. Then, the controller 16 stops outputting the forward rotation drive signal to the motor driver 21 and stops the carrying of the label 3 (ACT 29). The quality tag label issuing process ends here.

Figure 8:
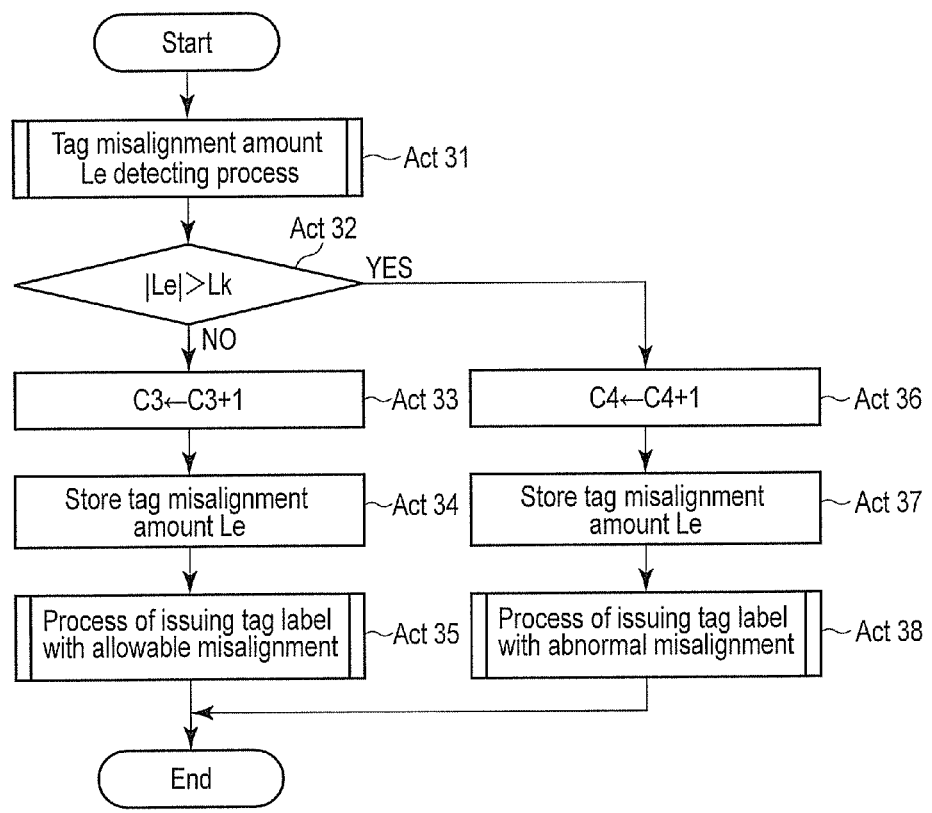
FIG. 8 is a flowchart showing the procedure of a defective tag label issuing process.

FIG. 8 is a flowchart showing the procedure of the defective tag label issuing process shown as ACT 11 in FIG. 6. As the defective tag label issuing process starts, the controller 16 detects a misalignment amount Le of the RFID tag 4 on the label 3 in which the tag identification information is not written normally to the RFID tag 4 (ACT 31: misalignment amount detecting unit). As for the misalignment amount Le, a misalignment in a direction away from the forward edge of the label is expressed as a positive misalignment (+Le) and a misalignment in a direction toward the forward edge is expressed as a negative misalignment (−Le). The misalignment amount detecting process will be described in detail later.

As the misalignment amount +Le or −Le of the RFID tag 4 is detected, the controller 16 determines whether the absolute value |Le| of this misalignment amount exceeds a predetermined value Lk or not (ACT 32). The predetermined value Lk is a maximum value within a misalignment amount range that the user recognizes as posing no problem in practical use, with respect to a misalignment of the mounting position of the RFID tag 4 from the prescribed position.

If the absolute value |Le| of the misalignment amount does not exceed the predetermined value Lk (NO in ACT 32), the label 3 with the RFID tag 4 is within an allowable range for practical use. In this case, the controller 16 increments the number of tags with allowable misalignment C3 in the counter table 32 by "1" (ACT 33). The controller 16 also stores the misalignment amount +Le or −Le of the RFID tag 4 in the misalignment amount table 33 in order of case number (ACT 34). After that, the controller 16 executes a process of issuing a tag label with allowable misalignment, described later, and ends the defective tag label issuing process (ACT 35).

If the absolute value |Le| of the misalignment amount exceeds the predetermined value Lk (YES in ACT 32), the label 3 with the RFID tag 4 is a defective label which falls out of the allowable range for practical use. In this case, the controller 16 increments the number of tags with abnormal misalignment C4 in the counter table 32 by "1" (ACT 36). The controller 16 also stores the misalignment amount +Le or −Le in the misalignment amount table 33 in order of case number (ACT 37). After that, the controller 16 executes a process of issuing a tag label with abnormal misalignment, described later, and ends the defective tag label issuing process (ACT 38).

Here, the processing of ACT 32 constitutes a label determining unit which determines the label 3 as defective when the misalignment amount Le detected by the misalignment amount detecting unit exceeds the predetermined value Lk.

FIGS. 9 and 10 are flowcharts showing the procedure of the process of issuing a tag label with allowable misalignment shown as ACT 35 in FIG. 8. As the process of issuing a tag label with allowable misalignment starts, the controller 16 first adds the misalignment amount Le to the distance L1 to calculate a distance L1' from the forward edge of the label 3 to the site where the RFID tag 4 is actually attached (ACT 41). Next, the controller 16 determines whether the misalignment amount Le is a positive value or a negative value (ACT 42).

If the misalignment amount Le has a positive value (YES in ACT 42), it means that the RFID tag 4 is misaligned by the amount Le in the direction away from the forward edge of the label 3. In this case, the controller 16 outputs a forward rotation drive signal for the motor 23 again to the motor driver 21 (ACT 43). Thus, the label 3 is carried further in the carrying direction C. The controller 16 resumes measuring the amount of carrying L.

If the misalignment amount Le has a negative value (NO in ACT 42), it means that the RFID tag 4 is misaligned by the amount Le in the direction toward the forward edge of the label 3. In this case, the controller 16 outputs a backward rotation drive signal for the motor 23 to the motor driver 21 (ACT 44). Thus, the label 3 is carried in a direction −C opposite to the carrying direction C. The controller 16 resumes measuring the amount of carrying L.

The controller 16 waits for the amount of carrying L to reach a distance (L1'+L2) (ACT 45). As the amount of carrying L reaches the distance (L1'+L2) (YES in ACT 45), the controller 16 stops the forward rotation drive signal or backward rotation drive signal and stops the carrying of the label 3 (ACT 46). Next, the controller 16 instructs the reader-writer body 14B to write tag identification information (ID) (ACT 47: identification information indicating unit). Then, the controller 16 determines whether the tag identification information is written to the RFID tag 4 normally or not (ACT 48).

If the tag identification information is written normally to the RFID tag 4 (YES in ACT 48), the controller 16 outputs a forward rotation drive signal for the motor 23 again to the motor driver 21 (ACT 49). Thus, the label 3 is carried further in the carrying direction C. The controller 16 resumes measuring the amount of carrying L and waits for the amount of carrying L to reach a distance L3 (ACT 50).

As the amount of carrying L reaches the distance L3 (YES in ACT 50), the forward edge of the label 3 in which the tag identification information is written normally on the RFID tag 4 that is misaligned by the misalignment amount Le is carried to the center of the print head 15A. Then, the controller 16 outputs a head-down drive signal to the separating and contacting mechanism drive unit 15C. The controller 16 also outputs information indicating the misalignment amount Le and label information to the head driver 15B (ACT 51). Thus, the information of the misalignment amount Le and the label information are printed on the print surface of the label 3.

Also in this printing, the controller 16 continues measuring the amount of carrying L. Then, the controller 16 waits for the amount of carrying L to reach a distance (L3+L1'−W) (ACT 52). As the amount of carrying L reaches the distance (L3+L1'−W) (YES in ACT 52), the stepped portion due to the RFID tag 4 that is misaligned by the misalignment amount Le on the label 3 arrives in front of the print head 15A. Then, the controller 16 outputs a head-up drive signal to the separating and contacting mechanism drive unit 15C (ACT 53). Thus, the print head 15A moves away from the print surface of the label 3 and the printing is suspended.

After that, the controller 16 waits for the amount of carrying L to reach a distance (L3+L1'+W) (ACT 54). As the amount of carrying L reaches the distance (L3+L1'+W) (YES in ACT 54), the stepped portion due to the RFID tag 4 on the label 3 passes the position of the print head 15A. Then, the controller 16 outputs a head-down drive signal again to the separating and contacting mechanism drive unit 15C (ACT 55). Thus, the print head 15A abuts again on the print surface of the label 3 and the printing is resumed. Therefore, even if the mounting position of the RFID tag 4 is shifted by the misalignment amount Le, the information of the misalignment amount Le and the label information are printed on the print surface of the label 3 except the stepped portion due to the RFID tag 4.

Here, the processing of ACT 52 and ACT 54 constitutes a tag position detecting unit which detects the position of the RFID tag 4 attached to the label 3, based on the misalignment amount Le detected by the misalignment amount detecting unit. The processing of ACT 51, ACT 53 and ACT 55 constitutes a print controller which causes the print unit 15 to print on the print surface of the label 3 with the RFID tag 4, except the position of the RFID tag 4 detected by the tag position detecting unit.

After that, the controller 16 waits for the amount of carrying L to reach a distance (L3+L0) (ACT 56). As the amount of carrying L reaches the distance (L3+L0) (YES in ACT 56), the controller 16 stops outputting the forward rotation drive signal to the motor driver 21 and stops the carrying of the label 3 (ACT 57). The process of issuing a tag label with allowable misalignment ends here.

Meanwhile, if the tag identification information is not written normally to the RFID tag 4 in response to the instruction to write the tag identification information (ID) (NO in ACT 48), the RFID tag 4 has a communication failure. In this case, the controller 16 decrements the number of tags with allowable misalignment C3 in the counter table 32 by "1" (ACT 58) and increments the number of tags with communication failure C5 by "1" (ACT 59).

After that, the controller 16 outputs a forward drive signal for the motor 23 again to the motor driver 21 (ACT 60). Thus, the label 3 is carried further in the carrying direction C. The controller 16 resumes measuring the amount of carrying L and waits for the amount of carrying L to reach the distance L3 (ACT 61).

As the amount of carrying L reaches the distance L3 (YES in ACT 61), the forward edge of the label 3 in which the tag identification information is not written normally to the RFID tag 4 that is misaligned by the misalignment amount Le is carried to the center of the print head 15A. Then, the controller 16 outputs a head-down drive signal to the separating and contacting mechanism drive unit 15C. The controller 16 also outputs information indicating a communication failure and print data of a special pattern indicating an error to the head driver 15B (ACT 62). Thus, the print head 15A abuts on the print surface of the label 3 and the information indicating a communication failure and the special pattern indicating an error are printed on the print surface.

Also in this printing, the controller 16 continues measuring the amount of carrying L. Then, the controller 16 executes the same processing as ACTS 52 to 57. Therefore, the information indicating a communication failure and the special pattern indicating an error are printed on the print surface of the label 3 except the stepped portion due to the misaligned RFID tag 4.

Figure 11:
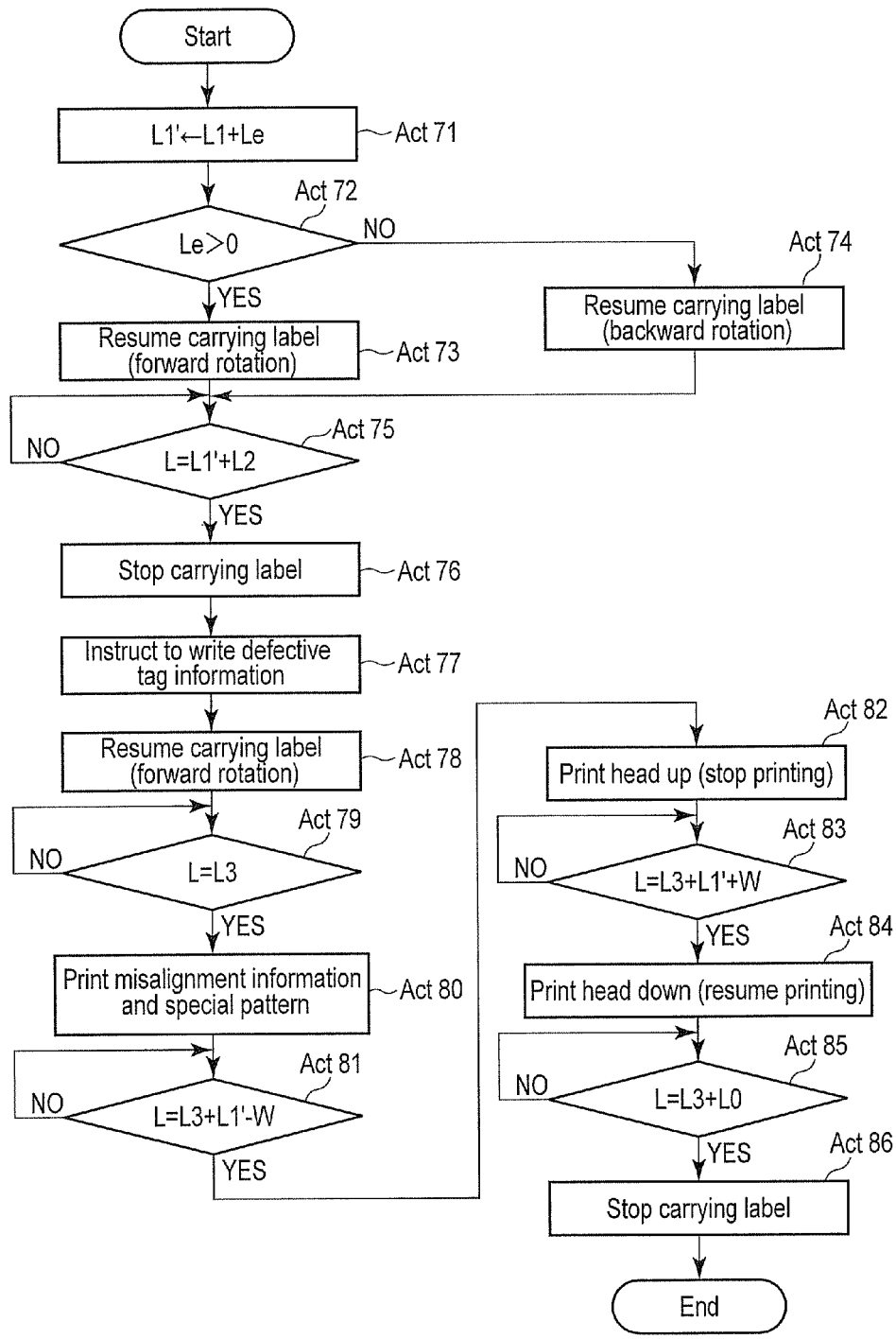
FIG. 11 is a flowchart showing the procedure of a process of issuing a tag label with abnormal misalignment.

FIG. 11 is a flowchart showing the procedure of the process of issuing a tag label with abnormal misalignment shown as ACT 38 in FIG. 8. This processing is similar to the processing carried out where the tag identification information is not written normally to the RFID tag 4 in the process of issuing a tag label with allowable misalignment. That is, this processing is similar to the processing of ACTS 41 to 48 (NO), ACTS 58 to 62 and ACTS 52 to 57 and therefore different features will be mainly described here.

In the process of issuing a tag label with abnormal misalignment, the processing of ACTS 71 to 76 is the same as the processing of ACTS 41 to 46 of the process of issuing a tag label with allowable misalignment. In the process of issuing a tag label with allowable misalignment, in ACT 47, the controller 16 instructs the reader-writer body 14B to write tag identification information (ID). In the process of issuing a tag label with abnormal misalignment, the controller 16 instructs the reader-writer body 14B to write information indicating that the tag is a defective tag because of a misalignment (ACT 77: defect information indicating unit).

After that, the controller 16 outputs a forward rotation drive signal for motor 23 again to the motor driver 21 (ACT 78). Thus, the label 3 is carried further in the carrying direction C. The controller 16 resumes measuring the amount of carrying L and waits for the amount of carrying L to reach the distance L3 (ACT 79).

As the amount of carrying L reaches the distance L3 (YES in ACT 79), the controller 16 outputs a head-down drive signal to the separating and contacting mechanism drive unit 15C and also outputs information indicating the misalignment amount Le and print data of a special pattern indicating an error to the head driver 15B (ACT 80). Thus, the information of the misalignment amount Le and the special pattern are printed on the print surface of the label 3.

Also in this printing, the controller 16 executes, in ACTS 81 to 86, the same processing as ACTS 52 to 57 of the process of issuing a tag label with allowable misalignment. Therefore, the information of the misalignment amount Le and the special pattern are printed on the print surface of the label 3 except the stepped portion due to the misaligned RFID tag 4.

Figure 12:
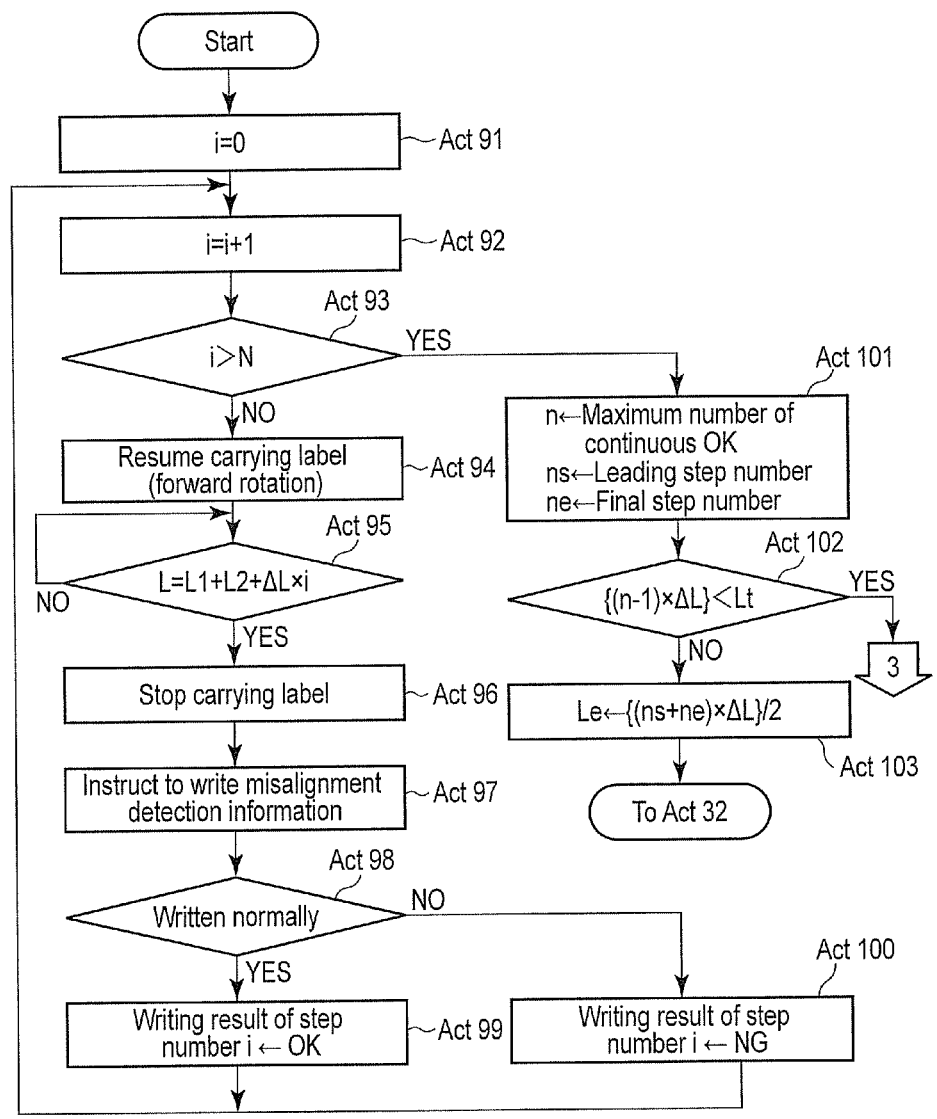
FIG. 12 is a flowchart showing the procedure of a tag misalignment amount detecting process.
Figure 13:
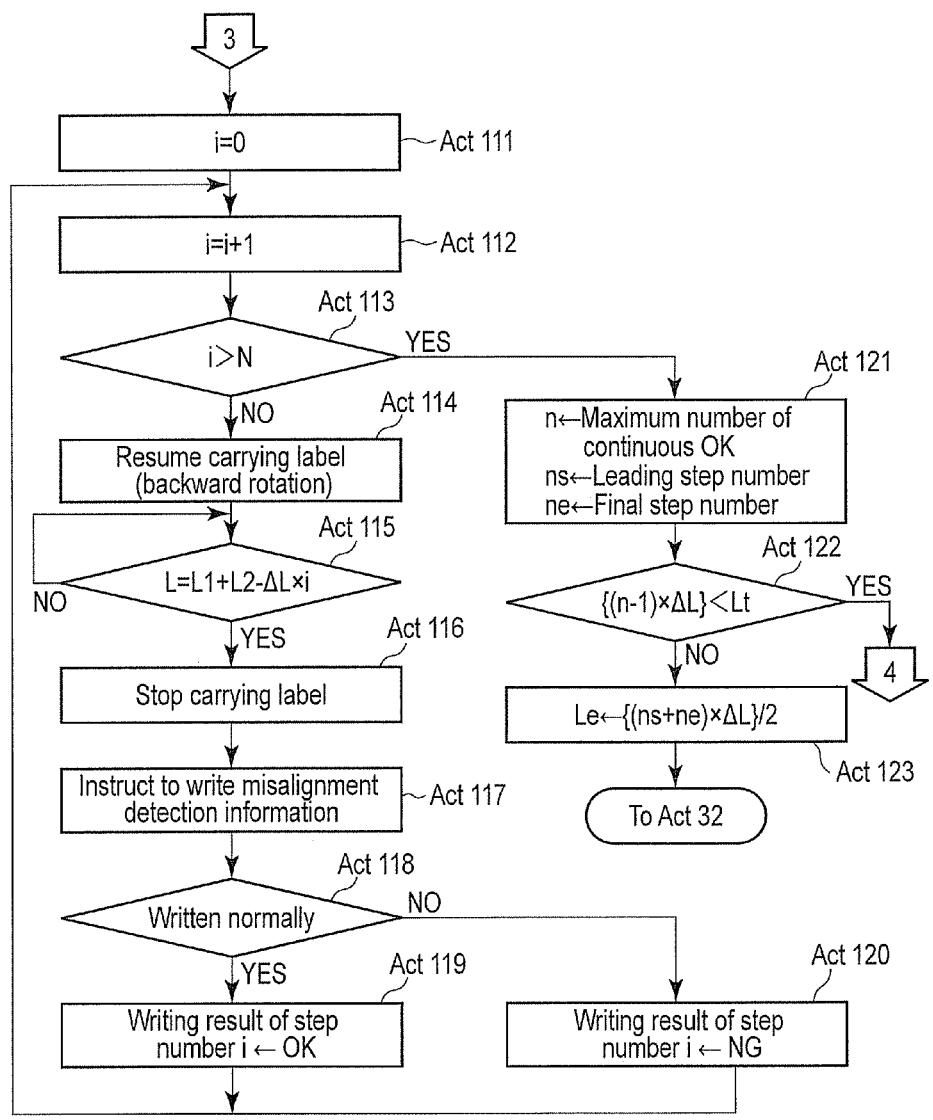
FIG. 13 is a flowchart showing a process procedure after the determination in ACT 102 results in "YES".

FIGS. 12 to 14 are flowcharts showing the procedure of the tag misalignment amount detecting process of ACT 31 in FIG. 8. As the tag misalignment amount detecting process starts, the controller 16 first initializes a step number counter i to "0" (ACT 91). Next, the controller 16 increments the step number counter i by "1" (ACT 92). Then, the controller 16 determines whether the step number counter i exceeds a maximum step number N (N≥2) or not (ACT 93).

The maximum step number N is decided by a resolution and size with which the tag misalignment amount Le is detected, along with a unit amount of carrying ΔL, described later. For example, if a misalignment amount is detected with a resolution of 1 millimeter and within a 20-millimeter range from a reference position, the unit amount of carrying ΔL is 1 millimeter and the maximum step number is 20.

If the step number counter i does not exceed the maximum step number N (NO in ACT 93), the controller 16 outputs a forward rotation drive signal for motor 23 to the motor driver 21 (ACT 94). Thus, the label 3 is carried further in the carrying direction C. The controller 16 resumes measuring the amount of carrying L. The controller 16 waits for the amount of carrying L to reach a distance (L1+L2+ΔL×i) (ACT 95). That is, the controller 16 waits for the label 3 to move by a distance (ΔL×i) in the carrying direction C from the reference position of the distance (L1+L2).

As the amount of carrying L reaches the distance (L1+L2+×L×i) (YES in ACT 95), the controller 16 stops the forward rotation drive signal and stops the carrying of the label 3 (ACT 96). Next, the controller 16 instructs the reader-writer body 14B to write information indicating misalignment detection in progress (ACT 97). Then, the controller 16 determines whether the information indicating misalignment detection in progress is written normally to the RFID tag 4 or not (ACT 98). The procedure for determination at this point is similar to ACT 7.

If the information indicating misalignment detection in progress is normally written to the RFID tag 4 (YES in ACT 98), the controller 16 stores data "OK" indicating a success in writing, in the writing result area corresponding to the step number i in the writing result table 31 (ACT 99). Meanwhile, if the information indicating misalignment detection in progress is not normally written to the RFID tag 4 (NO in ACT 98), the controller 16 stores data "NG" indicating a failure in writing, into a writing result area corresponding to the step number i in the writing result table 31 (ACT 100).

After that, the controller 16 returns to the processing of ACT 92. Thus, the controller 16 executes the processing of ACTS 93 to 100 every time the step number counter i is incremented by "1". That is, every time the label 3 is carried by the distance ΔL in the carrying direction C, the controller 16 instructs the reader-writer body 14B to write information indicating misalignment detection in progress and stores the result of the writing in the writing result table 31 in order of the step number i.

If the step number counter i exceeds the maximum step number N (YES in ACT 93), the controller 16 refers to the writing result table 31. Then, the controller 16 detects a range of step numbers where the largest number of data "OK" indicating a success in writing is continuously stored. The detected range can be regarded as a communication-available range of the RFID tag 4.

The controller 16 acquires a leading step number ns in this communication-available range, a final step number ne, and the total of step numbers n (n=ne-ns+1) (ACT 101). For example, if the largest number of data "OK" indicating a success in writing is stored continuously in a range from a step number "3" to a step number "8", the leading step number ns=3, the final step number ne=8, and the total of step numbers n=6 are acquired.

Next, the controller 16 determines whether the amount of carrying [(n−1)×ΔL] of the label 3 corresponding to this communication-available range is smaller than a preset threshold value Lt or not (ACT 102).

If the amount of carrying [(n−1)×ΔL] is equal to or greater than the threshold value Lt (NO in ACT 102), the controller 16 considers that the misaligned RFID tag 4 is detected. In this case, the controller 16 calculates the sum of the leading step number ns and the final step number ne, multiplied by the unit amount of carrying ΔL and then halved, as the misalignment amount Le of the RFID tag 4 (ACT 103). That is, the misalignment amount Le is expressed by the following equation (1).

$$Le = \{(ns+ne) \times \Delta L\}/2 \qquad (1)$$

After that, the controller 16 proceeds to the processing of ACT 32 in FIG. 8.

Meanwhile, if the amount of carrying [(n−1)×ΔL] is smaller than the threshold value Lt (YES in ACT 102), the controller 16 considers that the RFID tag 4 is misaligned in the opposite direction. In this case, the controller 16 executes, in ACTS 111 to 123, the same processing as the processing of ACTS 91 to 103 while carrying the label 3 in the direction opposite to the carrying direction C.

That is, every time the step number i is incremented by "1" (ACT 111, ACT 112, ACT 113), the controller 16 outputs a backward rotation drive signal for the motor 23 to the motor driver 21 (ACT 114). Then, if the amount of carrying L reaches a distance (L1+L2−ΔL×i) (YES in ACT 115), the controller 16 stops the carrying of the label 3 (ACT 116) and instructs the reader-writer body 14B to write information indicating misalignment detection in progress (ACT 117). Then, the controller 16 determined whether the information indicating misalignment detection in progress is normally written to the RFID tag 4 or not (ACT 118).

Here, if the information indicating misalignment detection in progress is normally written to the RFID tag 4 (YES in ACT 118), the controller 16 stores data "OK" indicating a success in writing, in the writing result area corresponding to the step number i in the writing result table 31 (ACT 119). Meanwhile, if the information indicating misalignment detection in progress is not normally written to the RFID tag 4 (NO in ACT 118), the controller 16 stores data "NG" indicating a failure in writing, in the writing result area (ACT 120).

If the step number counter i exceeds the maximum step number N (YES in ACT 113), the controller 16 refers to the writing result table 31. Then, the controller 16 detects a range of step numbers where the largest number of data "OK" indicating a success in writing is stored continuously, that is, a communication-available range of the RFID tag 4. Then, the controller 16 acquires a leading step number ns in this communication-available range, a final step number ne, and the total of step numbers n (n=ne−ns+1) (ACT 121).

If the amount of carrying [(n−1)×ΔL] of the label 3 corresponding to the communication-available range is equal to or greater than a preset threshold value Lt (NO in ACT 122), the controller 16 considers that the misaligned RFID tag 4 is detected. Then, the controller 16 calculates the sum of the leading step number ns and the final step number ne, multiplied by the unit amount of carrying ΔL and then halved, as the misalignment amount −Le of the RFID tag 4 (ACT 123).

That is, the misalignment amount Le is expressed by the following equation (2).

$$Le = -\{(ns+ne) \times \Delta L\}/2 \qquad (2)$$

After that, the controller 16 proceeds to the processing of ACT 32 in FIG. 8.

Meanwhile, if the amount of carrying [(n−1)×ΔL] is smaller than the threshold value Lt (YES in ACT 122), the controller 16 considers that the RFID tag 4 has a narrow communication-available range and therefore has a communication failure. In this case, the controller 16 executes, in ACTS 131 to 140, the same processing as the processing of ACTS 59 to 62 and ACTS 52 to 57 of the process of issuing a tag label with allowable misalignment, except for the following.

The difference between this processing and the process of issuing a tag label with allowable misalignment is the time point when the controller 16 outputs a head-up drive signal to the separating and contacting mechanism drive unit 15C and the time point when the controller 16 outputs a head-down drive signal. That is, in the tag misalignment amount detecting process, if the amount of carrying L reaches a distance (L3+L1−W) (YES in ACT 135), the controller 16 outputs a head-up drive signal (ACT 136). Meanwhile, if the amount of carrying L reaches a distance (L3+L1+W) (YES in ACT 137), the controller 16 outputs a head-down drive signal (ACT 138). Therefore, information indicating a communication failure and a special pattern are printed on a portion where no step due to the RFID tag 4 is formed, of the print surface of the label 3.

In this way, if the reader-writer unit 14 cannot write tag identification information to the RFID tag 4 attached to the label 3, the controller 16 detects the misalignment amount Le of the RFID tag 4 from the reference position. Therefore, when the writing of the tag identification information to the RFID tag 4 fails, the user can obtain information for determining whether the failure is due to a misalignment of the RFID tag 4 or not, based on information of the misalignment amount Le.

Also, when the controller 16 is detecting the misalignment amount Le of the RFID tag 4, the reader-writer unit 14 writes information indicating misalignment detection in progress to the RFID tag 4. Therefore, the user can easily identify whether the RFID tag 4 is misaligned or not by analyzing the information written on the RFID tag 4.

Moreover, when the misalignment amount Le of the RFID tag 4 is equal to or smaller than the predetermined value Lk, the controller 16 adjusts the amount of carrying of the label 3 to a distance (L1+Le) and positions the RFID tag 4 within the communication range of the antenna 14A. Then, the reader-writer unit 14 writes the tag identification information to the RFID tag 4. Therefore, even when the RFID tag 4 attached to the label 3 is misaligned, if the misalignment amount Le is equal to or smaller than the predetermined value Lk, this label 3 is treated as a quality product.

Meanwhile, if the misalignment amount of the RFID tag 4 exceeds the predetermined value Lk, the controller 16 determines the label 3 with this RFID tag 4 as defective. Therefore, all the labels 3 on which the RFID tag 4 has a misalignment exceeding the predetermined value Lk are treated as defective products. Thus, the user can feed back the information of the defective product to the label manufacturer, thus improving the quality.

Also, to the RFID tag 4 attached to the label 3 that is determined as defective because the misalignment amount of the RFID tag 4 exceeds the predetermined value Lk, the reader-writer unit 14 writes information indicating that this tag is a defective tag due to misalignment. Therefore, the user can analyze the information written on the RFID tag 4 to easily understand that the RFID tag 4 is a defective tag due to misalignment.

Moreover, on the print surface of the label 3 that is determined as defective because the misalignment amount of the RFID tag 4 exceeds the predetermined value Lk, a special pattern indicating an error is printed by the print unit 15. Therefore, simply by taking a glance at the label 3, the user can easily identify that the label 3 is a defective product.

By the way, when the print unit 15 prints on the print surface of the label 3, the controller 16 controls the print unit 15 so that the print head 15A is moved away from the print surface so as not to print on the stepped portion due to the RFID tag 4. Even when the RFID tag 4 is misaligned, this function is realized as the controller 16 estimates the position of the RFID tag 4 based on the misalignment amount Le and controls the up-down movement of the print head 15A. Therefore, damage or wear of the print head 15A due to the step and damage of the RFID tag 4 can be prevented.

Also, on the print surface of the label 3 where misalignment detection of the RFID tag 4 is carried out, information of the misalignment amount Le is printed by the print unit 15. Therefore, based on the print information on the label 3, the user can easily acquire information such as whether the RFID tag 4 is misaligned or not and even detailed information such as how large the misalignment amount is.

Moreover, if the result of the detection of the misalignment amount of the RFID tag 4 shows that the communication-available range of the RFID tag 4 is narrower than the threshold value Lt, the controller 16 determines the RFID tag 4 as having a communication failure. Therefore, the RFID tag issuing apparatus 10 can easily detect not only a misalignment of the RFID tag 4 but also the RFID tag 4 having a communication failure.

Furthermore, on the print surface of the label 3 where the RFID tag 4 is determined as having a communication failure, information that there is a communication failure is printed by the print unit 15. Therefore, simply by taking a glance at the label 3, the user can easily recognize that the RFID tag 4 attached to the label 3 has a communication failure.

Next, a second embodiment of detecting the misalignment amount of the RFID tag 4 will be described. Also in this second embodiment, first, the controller 16 of the RFID tag issuing apparatus 10 detects the forward edge as a specific position on the label 3 carried through the carrying path, based on a signal from the mark sensor 13.

As the forward edge of the label 3 is detected, the controller 16 instructs the reader-writer unit 14 to communicate with the RFID tag 4 at the time point when the label 3 reaches the reference position as the label 3 is carried by a predetermined amount (L1+L2) in the carrying direction C after the forward edge of the label 3 is detected. Then, the controller 16 acquires the result of the communication carried out by the reader-writer unit 14 with the RFID tag 4.

If this result shows a communication failure, the controller 16 repeats the carrying of the label 3 and the communication instruction to the reader-writer unit 14 and thus searches for a communication-available range with the RFID tag 4. In the communication-available range, the controller 16 detects a reception level of a response signal from the RFID tag 4. Then, the controller 16 finds a point with the highest reception level in the communication-available range and detects the amount of carrying of the label 3 from the reference position to the point with the highest reception level, as the misalignment amount of the RFID tag 4.

Figures 15, 16:
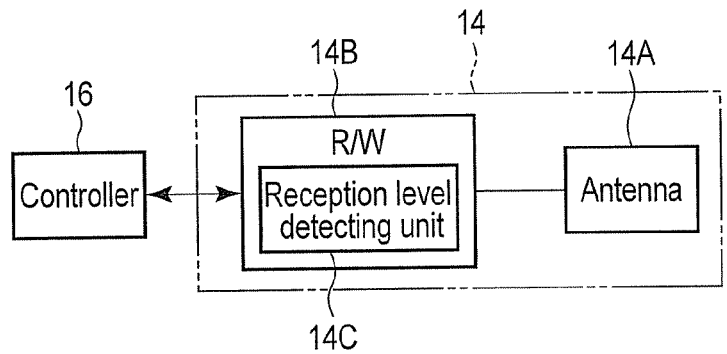
FIG. 15 is a block diagram showing a reader-writer unit of an RFID tag issuing apparatus according to a second embodiment.
FIG. 16 shows a misalignment amount table formed in a storage.

In the second embodiment, the reader-writer body 14B of the reader-writer unit 14 is provided with a reception level detecting unit 14C which detects the reception level of the response signal from the RFID tag 4 by a known technique, as shown in FIG. 15. Also, the misalignment amount table 33 in the storage 24 has an area for storing the misalignment amounts Le1, Le2, Le3, Le4, . . . and the reception level in order of case number, as shown in FIG. 16.

Figure 17:
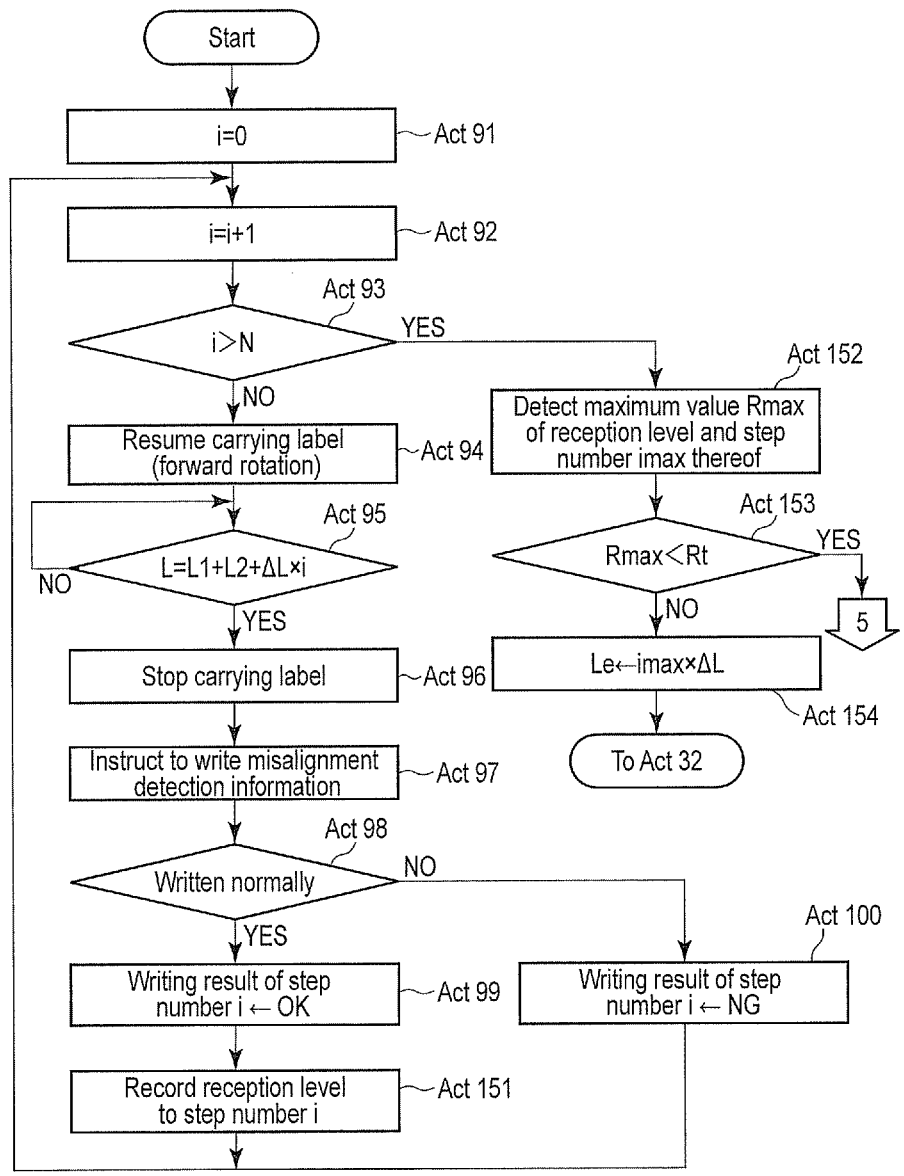
FIG. 17 is a flowchart showing the procedure of a tag misalignment amount detecting process executed by a controller.
Figure 18:
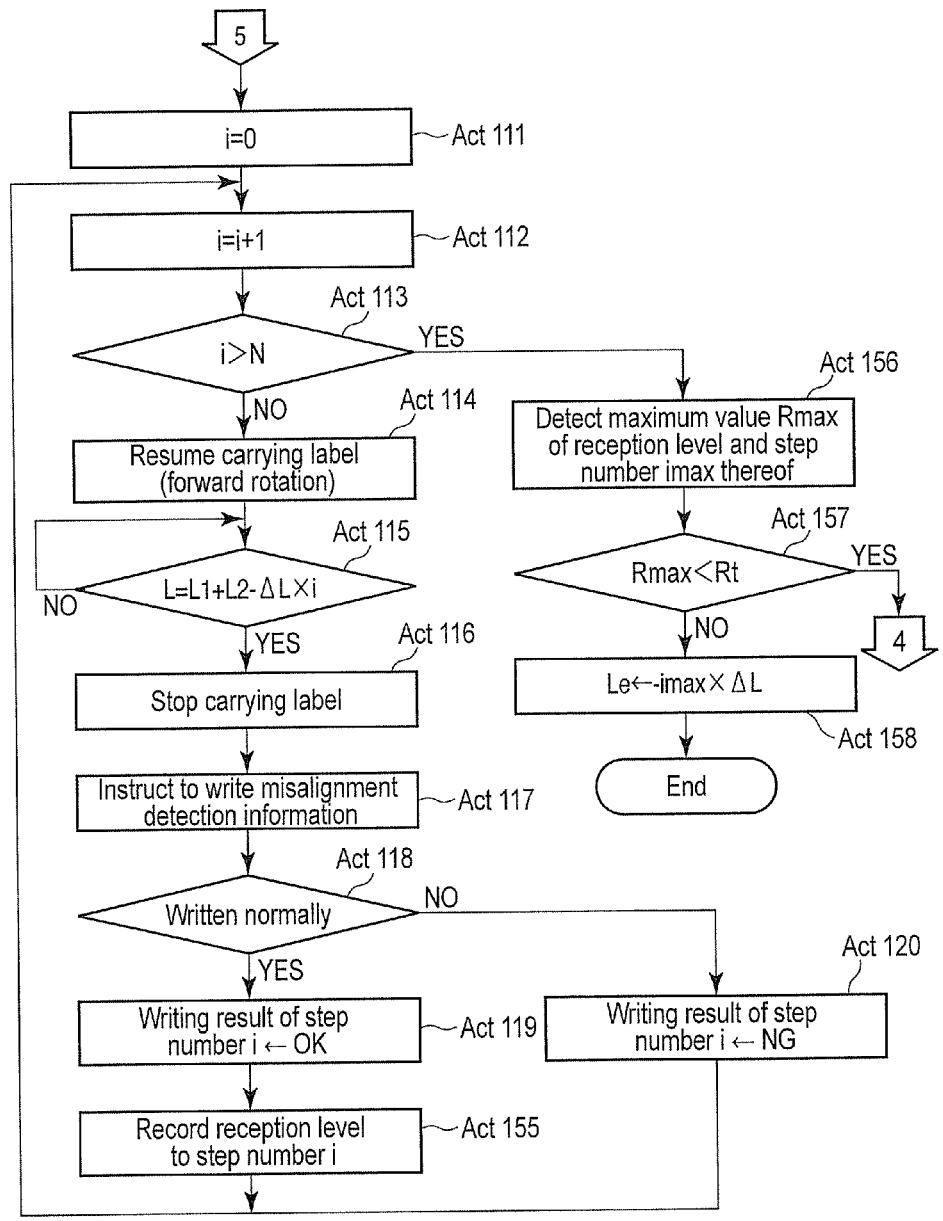
FIG. 18 is a flowchart showing a process procedure after the determination in ACT 153 results in "YES".

The other parts of the configuration of the REID tag issuing apparatus are similar to the configuration of FIGS. 3 and 4 described in the first embodiment. The process procedure taken by the controller 16 is different only in part of the tag misalignment amount detecting process (ACT 31 of FIG. 8). A part of the procedure of the tag misalignment amount detecting process according to the second embodiment is shown in FIGS. 17 and 18. The same parts of the process as FIGS. 12 and 13 showing the procedure of the tag misalignment amount detecting process according to the first embodiment are denoted by the same reference numerals.

That is, in the second embodiment, if it is determined that information indicating misalignment detection in progress is normally written to the REID tag 4 in ACT 98 (YES in ACT 98), the controller 16 stores data "OK" indicating a success in writing, in the writing result area corresponding to the step number i in the writing result table 31 (ACT 99). The controller 16 also stores the reception level detected by the reception level detecting unit 14C, in the reception level area (ACT 151).

After that, if the step number counter i exceeds the maximum step number N in ACT 93 (YES in ACT 93), the controller 16 refers to the writing result table 31. Then, the controller 16 detects a maximum value Rmax of the reception level and a step number imax corresponding to the maximum value Rmax (ACT 152). Then, the controller 16 determines whether the maximum value Rmax of the reception level is smaller than a preset threshold value Rt or not (ACT 153).

If the maximum value Rmax of the reception level is equal to or greater than the threshold value Rt (NO in ACT 153), the controller 16 considers that the misaligned RFID tag 4 is detected. In this case, the controller 16 calculates the step number imax corresponding to the maximum value Rmax of the reception level, multiplied by the unit amount of carrying ΔL, as the misalignment amount Le of the RFID tag 4 (ACT 154). That is, the misalignment amount Le is expressed by the following equation (3).

$$Le = imax \times \Delta L \quad (3)$$

After that, the controller 16 proceeds to the processing of ACT 32 in FIG. 8.

Meanwhile, if the maximum value Rmax of the reception level is smaller than the threshold value Rt (YES in ACT 53), the controller 16 considers that the RFID tag 4 is misaligned in the opposite direction. Also in this case, if it is determined that information indicating misalignment detection in progress is normally written to the RFID tag 4 in ACT 118 (YES in ACT 118), the controller 16 stores data "OK" indicating a success in writing, in the writing result area corresponding to the step number i in the writing result table 31 (ACT 119). The controller 16 also stores the reception level detected by the reception level detecting unit 14, in the reception level area (ACT 155).

After that, if the step number counter i exceeds the maximum step number N in ACT 113 (YES in ACT 113), the controller 16 refers to the writing result table 31. Then, the controller 16 detects a maximum value Rmax of the reception level and a step number imax corresponding to the maximum value (ACT 156). Then, the controller 16 determines whether the maximum value Rmax of the reception level is smaller than a preset threshold value Rt or not (ACT 157).

If the maximum value Rmax of the reception level is equal to or greater than the threshold value Rt (NO in ACT 157), the controller 16 considers that the misaligned RFID tag 4 is detected. In this case, the controller 16 calculates the step number imax corresponding to the maximum value Rmax of the reception level, multiplied by the unit amount of carrying ΔL, as the misalignment amount −Le of the RFID tag 4 (ACT 158). That is, the misalignment amount Le is expressed by the following equation (4).

$$Le = -imax \times \Delta L \quad (4)$$

After that, the controller 16 proceeds to the processing of ACT 32 in FIG. 8.

Meanwhile, if the maximum value Rmax of the reception level is smaller than the threshold value Rt (YES in ACT 157), the controller 16 executes processing similar to the processing described with reference to FIG. 14 in the first embodiment.

The second embodiment of this configuration can have similar effects and advantages to the first embodiment.

In the first and second embodiments, the label 3 is used as an example of a medium to which the RFID tag 4 is attached, and the RFID tag issuing apparatus 10 prints on the print surface of the label 3. However, the function of printing on the label 3 may be omitted. That is, the embodiment described herein can be applied generally to an apparatus which issues an RFID tag attached to other media than a label.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An RFID tag issuing apparatus comprising:
a reader-writer unit which reads and writes data by wireless communication with an RFID tag attached to a label;
a label position detecting unit which detects a specific position on the label;
a communication instructing unit which instructs the reader-writer unit to communicate with the RFID tag at a reference position that is reached when the label is carried by a predetermined amount in a predetermined direction after the specific position on the label is detected by the label position detecting unit;
a search unit which repeats a process of carrying of the label in the predetermined direction or a direction opposite to the predetermined direction and a process of instructing communication to the reader-writer with the RFID tag when communication cannot be established with the RFID tag as a result of an operation of the reader-writer according to the instruction from the communication instructing unit, and thus searches for a communication-available range with the RFID tag;
a misalignment amount detecting unit which detects an amount of carrying of the label from the reference position of the label to reach the communication-available range from the reference position, as a misalignment amount from the specific position of the labeled RFID tag to a carrying direction;
an identification information indicating unit which instructs the reader-writer to write identification information at a time point when the label is carried by the misalignment amount from the reference position, when the misalignment amount is within a predetermined value;
a label determining unit which determines the label as defective when the misalignment amount exceeds the predetermined value;
a defect information indicating unit which instructs the reader-writer unit to write defect information at a time point when the label is carried by the misalignment amount from the reference position, when the label is determined as defective;
a print unit which prints on a print surface of the label;
a tag position detecting unit which detects a position of the RFID tag attached to the label, based on the misalignment amount; and
a print controller which causes the print unit to print on the print surface of the label with the RFID tag attached thereto, except for the position of the RFID tag detected by the tag position detecting unit,
wherein the print controller causes information indicating the misalignment amount to be printed together with a pattern indicating an error on the print surface of the label that is determined as defective by the label determining unit.

2. The apparatus of claim 1, wherein the search unit gives an instruction to write information indicating misalignment detection in progress, as the communication instruction repeated to the reader-writer unit.

3. The apparatus of claim 1, further comprising a defect determining unit which determines the RFID tag as defective when the communication-available range is narrower than a threshold value.

4. The apparatus of claim 3,
wherein the print controller causes information indicating that the RFID tag is defective to be printed on the print surface of the label with the RFID tag that is determined as defective.

5. The apparatus of claim 1, further comprising a defect determining unit which determines the RFID tag as defective when a reception level in the communication-available range is lower than a threshold value.

6. The apparatus of claim 5,
wherein the print controller causes information indicating that the RFID tag is defective to be printed on the print surface of the label with the RFID tag that is determined as defective.

7. An RFID tag issuing apparatus comprising:
a reader-writer which reads and writes data by wireless communication with an RFID tag attached to a label;
a label position detector which detects a specific position on the label;
a communication instructor which instructs the reader-writer to communicate with the RFID tag at a reference position that is reached when the label is carried by a predetermined amount in a predetermined direction after the specific position on the label is detected by the label position detector;
a searcher which repeats a process of carrying of the label in the predetermined direction or a direction opposite to the predetermined direction and a process of instructing communication to the reader-writer with the RFID tag when communication cannot be established with the RFID tag as a result of an operation of the reader-writer according to the instruction from the communication instructor, and thus searches for a communication-available range with the RFID tag;
a misalignment amount detector which detects an amount of carrying of the label from the reference position of the label to reach the communication-available range from the reference position, as a misalignment amount from the specific position of the labeled RFID tag to a carrying direction;
a label determiner which determines the label as defective when the misalignment amount exceeds the predetermined value;
a printer which prints on a print surface of the label;
a tag position detector which detects a position of the RFID tag attached to the label, based on the misalignment amount; and
a print controller which causes the printer to print information indicating the misalignment amount together with a pattern indicating an error on the print surface of the label with the RFID tag attached thereto, except for the position of the RFID tag detected by the tag position detector for the label that is determined as defective by the label determiner.

8. The apparatus of claim 7, wherein the searcher gives an instruction to write information indicating misalignment detection in progress, as the communication instruction repeated to the reader-writer.

9. The apparatus of claim 7, further comprising a defect determiner which determines the RFID tag as defective when the communication-available range is narrower than a threshold value.

10. The apparatus of claim 9, wherein the print controller causes information indicating that the RFID tag is defective to be printed on the print surface of the label with the RFID tag that is determined as defective.

11. The apparatus of claim 7, further comprising a defect determiner which determines the RFID tag as defective when a reception level in the communication-available range is lower than a threshold value.

12. The apparatus of claim 11, wherein the print controller causes information indicating that the RFID tag is defective to be printed on the print surface of the label with the RFID tag that is determined as defective.

13. An RFID tag issuing apparatus comprising:
a reader-writer which reads and writes data by wireless communication with an RFID tag attached to a label;
a label position detector which detects a specific position on the label;
a communication instructor which instructs the reader-writer to communicate with the RFID tag at a reference position that is reached when the label is carried by a predetermined amount in a predetermined direction after the specific position on the label is detected by the label position detector;
a searcher which repeats a process of carrying of the label in the predetermined direction or a direction opposite to the predetermined direction and a process of instructing communication to the reader-writer with the RFID tag when communication cannot be established with the RFID tag as a result of an operation of the reader-writer according to the instruction from the communication instructor, and thus searches for a communication-available range with the RFID tag;
a misalignment amount detector which detects an amount of carrying of the label from the reference position of the label to reach the communication-available range from the reference position, as a misalignment amount from the specific position of the labeled RFID tag to a carrying direction;
a label determiner which determines the label as defective when an absolute value of the misalignment amount exceeds the predetermined value; and
a controller which instructs the reader-writer to write defect information at a time point when the label is misaligned for the misalignment amount from the reference position, when the label is determined as defective by the label determiner.

14. The apparatus of claim 13, wherein the searcher instructs to write information indicating misalignment detection in progress, as the communication instruction repeated to the reader-writer.

15. The apparatus of claim 13, wherein the controller instructs the reader-writer to write identification information at a time point when the label is carried by the misalignment amount from the reference position, when an absolute value of the misalignment amount is within a predetermined value.

16. The apparatus of claim 13, further comprising a defect determiner which determines the RFID tag as defective when the communication-available range is narrower than a threshold value.

17. The apparatus of claim 13, further comprising a defect determiner which determines the RFID tag as defective when a reception level in the communication-available range is lower than a threshold value.

* * * * *